Dec. 4, 1962  C. B. ARMOUR  3,066,568
PIN HAVING RECESSED PACKED HEAD WITH PACKING FOLLOWER
Filed Nov. 18, 1959
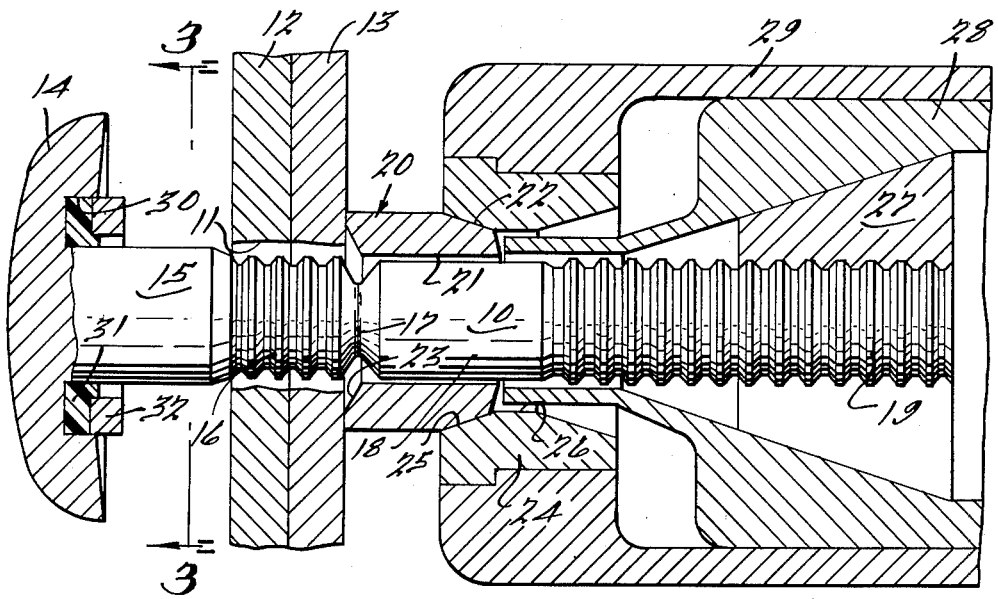
FIG. 1.
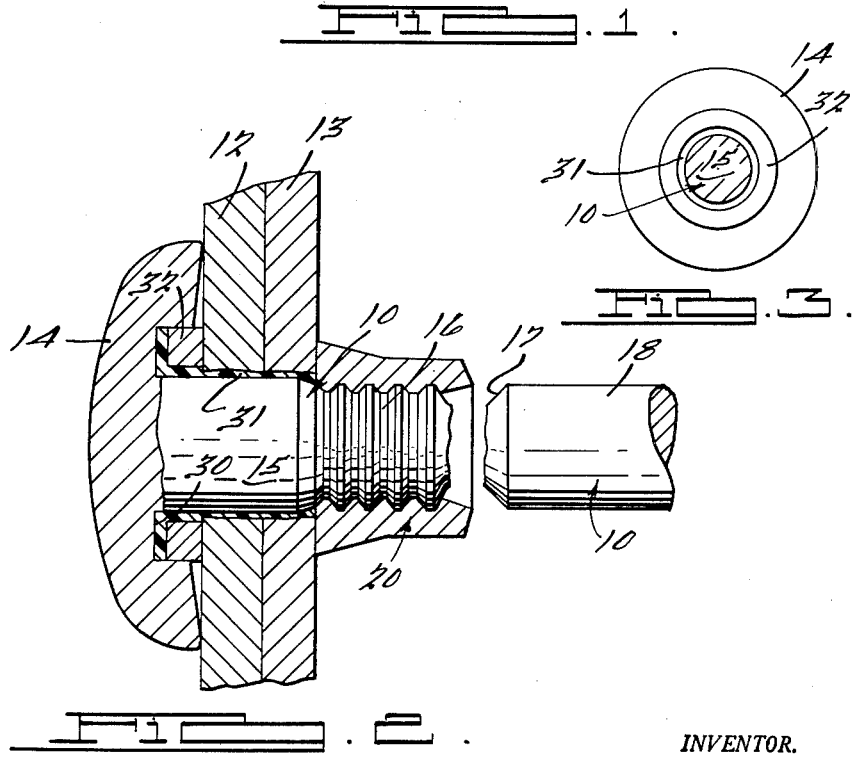
FIG. 2.
FIG. 3.
INVENTOR.
Charles B. Armour.
BY
Harness, Dickey & Pierce.
ATTORNEYS.

United States Patent Office 3,066,568
Patented Dec. 4, 1962

3,066,568
PIN HAVING RECESSED PACKED HEAD WITH PACKING FOLLOWER
Charles B. Armour, Lake Forest, Ill., assignor to Huck Manufacturing Company
Filed Nov. 18, 1959, Ser. No. 853,779
1 Claim (Cl. 85—7)

The present invention relates to improvements in fastening devices and particularly relates to improvements in sealed fasteners, in which means are provided for effectively sealing the opening, through which one of the fastener elements extends, against leakage.

In general, the present invention comprises a fastener in the form of a pin or bolt having an integral head adapted to cooperate with another fastener element such as a collar or nut. The sealing means is provided on the underside of the head on the pin, and comprises a cavity formed in the underside of the head around the stem of the pin within which a plastic or flowable sealing element is disposed. A slidable plunger is mounted within the cavity around the stem and projects beyond the under surface of the head before the fastener is applied. When the fastener is applied by inserting the stem through an opening in the work, the head of the pin approaches the adjacent side of the work. As the pin is pulled or moved through the opening, the plunger strikes the adjacent surface of the work and is forced into the cavity as the head is pulled against the work. As the plunger moves inwardly the plastic sealing material is forced outwardly of the cavity around stem into the space between the pin and the adjacent wall of the opening.

One of the primary objects of the present invention is to provide an improved fastener in the use of which an opening through which the fastener is mounted is effectively sealed against leakage and side movement of the pin.

Other objects of the invention will become apparent from the following specification and drawing relating thereto, and from the claims hereinafter set forth.

In the drawing in which like numerals are used to designate like parts in the several views throughout:

FIG. 1 is a cross-sectional view, with parts of the fastener in elevation, illustrating a fastener assembled with the work prior to the setting operation in accordance with the present invention;

FIG. 2 is a view similar to FIG. 1, but with the driving tool removed and showing the finally driven fastener and FIG. 3 is a sectional view taken substantially along the line 3—3 of FIG. 1.

The specific embodiment of the invention as being applied to a lock bolt is of the general type disclosed in Huck Patent 2,531,049.

Referring to the drawing, the fastener comprises a pin or locking bolt generally indicated at 10, which is adapted to extend through an aligned opening 11 in a pair of plates or panels 12 and 13. The plates or panels may be of metal, such as steel or aluminum.

The pin 10 has an integral head 14 adapted to engage the adjacent face of panel 12 with the body portion of the pin adapted to extend through the aligned openings 11.

The pin 10 also includes a cylindrical portion 15 adjacent the head 14 and an annularly grooved portion 16 adjacent portion 15.

The groove portion 16 comprises a series of annular ribs with grooved bottoms therebetween providing locking grooves.

At the end of the groove portion 16, remote from the head 14, the pin has a groove or break-neck 17, and this point represents the weakest point of the pin so that the pin will break under tension at this point before it will break under tension at any other point. Next to the break-neck 17 the pin has a cylindrical portion 18 and this portion terminates at its outer end in a grooved or gripping portion 19, which provides a series of annular pull grooves.

The second part of the fastener comprises a collar or head generally indicated at 20 which is adapted to be received over the end of the pin in a relationship to the adjacent side of panel 13 as shown in FIG. 1. The collar 20 is adapted to be swaged or contracted radially inwardly into the locking grooves 16 of the pin, when the collar is driven as shown in FIG. 2 and to form a head against the plate 13 in the completed operation.

So far as the present invention is concerned the collar 20 may have different configurations and in the embodiment illustrated has a smooth internal bore 21 and an annular hold-off taper 22 formed on the outer periphery of the collar adjacent the outer end. The collar also has an annular internal taper or counterbore 23 formed on the opposite face of the collar 20.

The fastener is set by means of a riveting mechanism of the type disclosed in Huck Patent 2,531,049 and 2,114,493 and a portion of said mechanism is shown in FIG. 1. Such mechanism comprises an anvil 24 having a frustoconical portion 25 which is substantially complementary to the frustoconical hold-off surface 22 on the collar. At the smaller end the surface 25 joins a short cylindrical bore 26.

In order to grip the grooved portion 19 of the pin, jaws 27 are provided which are adapted to be contracted and moved by a jaw contracting and moving sleeve element 28. When the jaws 27 and member 28 move to the right to pull the pin, the reaction to any pull is applied through a barrel or sleeve 29 and then through the anvil 24 which is mounted in the sleeve 29. After the pin is inserted through the aligned openings 11 in the plates, the collar 20 is placed over the pin and the riveting mechanism is applied over the pin until the pull grooves at 19 are gripped between jaws 27. Initial operation of the mechanism causes the pin to be pulled and the flared portion of the anvil to move into contact with the collar so as to press the collar against plate 13.

With the collar against the plate 13 and the jaws gripping the pin, further pull on the pin will pull the pin through the opening so that the head 14 approaches the adjacent plate 12 and in its final position is pulled tightly up against the adjacent face of plate 12.

Continued pulling of the pin causes the collar 20 to be swaged into the locking grooves 16 as shown in FIG. 2, and finally the pin tail is broken from the pin at the break-neck 17.

According to the present invention and for purposes of illustration, the space between the openings 11 and the adjacent portion 15 is shown in slightly exaggerated form.

A cylindrical or annular cavity 30 is formed in the underside of the head 14 opening through the underface of the head adjacent the wall of the work. The outer annular wall of the cavity 30 is substantially concentric with the cylindrical portion 15. A plastic sealing element 31 which may be in the form of a ring is disposed within the base of the cavity 30. Said plastic element 31 may be formed of different materials and may be formed for example of a synthetic rubber having a softness which will permit it to readily flow into a small space but will retain its integrity. Also, such a material could be of a soft metal which would serve as a sealing means.

A rigid metal ring 32 embraces the pin and is slidably disposed within the cavity 30 with the outer periphery of the ring 32 assembled with a tight sliding fit against the outer peripheral surface of the cavity 30. The inner annular surface or opening through the ring 32 is spaced outwardly from the adjacent surface of cylindrical portion 15.

The ring 32 serves to confine the sealing material 31 and direct the path of movement of the sealing means into the space between the pin and the opening walls when the fastener is finally set.

As the pin 10 is pulled to its final position the annular ring 32, which is initially positioned so that it is projecting beyond the end surface of the head 14, first abuts against the plate 12 and is forced into the cavity 30, acting as a plunger to force or extrude and guide the sealing material through the space between the ring 32 and the cylindrical surface 15 and into any space that may exist between the cylindrical portion 15 and the adjacent wall of opening 11 (FIGURE 2). The adjacent surface of the head 14 will be pulled tightly against the panel 12 in the finally set position as shown in FIG. 2, and the plunger 32 is held in its innermost position so as to keep the sealing material in the space to be sealed at all times.

Formal changes may be made in the specific embodiment of the invention described without departing from the spirit and scope of the appended claim.

What is claimed is:

A fastener pin comprising a stem adapted to project through an opening in a workpiece, a head formed at one end of said stem adjacent a straight portion thereof and adapted to bear against said workpiece around said opening, said head having a generally frusto-conically shaped underside, an annular cavity formed in said underside of said head with said cavity having an annular wall extending about said straight portion of said stem, an annular plastic sealing element disposed within said cavity and extending radially from said annular wall to said straight portion of said stem, an annular plunger having a width less than the axial distance from the axially outer extremity of said underside of said head to the axially inner termination of said annular cavity and having one end located within said cavity in abutment with said sealing element and an opposite end located axially outwardly beyond said outer extremity of said underside of said head, said plunger having an axially extending straight, radially outer annular surface slidably engageable with said annular wall of said cavity and having an axially extending straight, radially inner, annular surface radially spaced from said straight portion of said stem, said plunger adapted to be moved axially inwardly to a position completely within the confines of said underside of said head and against said plastic element to guidably displace said plastic element between said radially inner surface of said plunger and said straight portion of said stem and axially outwardly of said cavity, said sealing element as initially disposed in said cavity with said plunger in abutment therewith having its axially outermost extremity terminating at least within the bounds of the initial axial position of said opposite end of said plunger.

References Cited in the file of this patent

UNITED STATES PATENTS

| | | |
|---|---|---|
| 154,851 | Dittman | Sept. 8, 1874 |
| 1,274,988 | Chadwick | Aug. 6, 1918 |
| 2,082,348 | Le Tarte | June 1, 1937 |
| 2,250,343 | Zigler | July 22, 1941 |
| 2,307,828 | Eggleston | Jan. 12, 1943 |
| 2,499,024 | Hollyday | Feb. 28, 1950 |
| 2,531,048 | Huck | Nov. 21, 1950 |
| 2,718,691 | Sussenbach | Sept. 27, 1955 |
| 2,872,961 | Mills et al. | Feb. 10, 1959 |
| 3,004,776 | Sebardt | Oct. 17, 1961 |

FOREIGN PATENTS

| | | |
|---|---|---|
| 852,757 | Great Britain | Nov. 2, 1960 |